US012598382B2

(12) United States Patent
Kitsunai

(10) Patent No.: US 12,598,382 B2
(45) Date of Patent: Apr. 7, 2026

(54) IMAGE PROCESSING APPARATUS FOR ACQUIRING A REFOCUS IMAGE, IMAGE PICKUP APPARATUS FOR ACQUIRING A REFOCUS IMAGE, IMAGE PROCESSING METHOD FOR ACQUIRING A REFOCUS IMAGE, AND STORAGE MEDIUM

(71) Applicant: CANON KABUSHIKI KAISHA, Tokyo (JP)

(72) Inventor: Takahiro Kitsunai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 18/642,191

(22) Filed: Apr. 22, 2024

(65) Prior Publication Data

US 2024/0414436 A1  Dec. 12, 2024

(30) Foreign Application Priority Data

Jun. 8, 2023  (JP) ................................. 2023-095033

(51) Int. Cl.
*H04N 23/67* (2023.01)
*G06T 5/50* (2006.01)

(52) U.S. Cl.
CPC ............... *H04N 23/67* (2023.01); *G06T 5/50* (2013.01); *G06T 2207/10148* (2013.01)

(58) Field of Classification Search
CPC ........ H04N 23/16; H04N 23/13; H04N 23/67; H04N 23/675; H04N 23/676; G06T 5/50; G06T 2207/10148
See application file for complete search history.

(56) References Cited

U.S. PATENT DOCUMENTS

| | | | | |
|---|---|---|---|---|
| 9,729,774 B2 * | 8/2017 | Ueda | ..................... | H04N 23/673 |
| 12,143,709 B2 * | 11/2024 | Inazawa | ............... | H04N 23/633 |
| 2021/0400180 A1 * | 12/2021 | Omata | ...................... | G06T 7/80 |
| 2022/0400208 A1 * | 12/2022 | Takao | .................. | H04N 23/635 |
| 2023/0113949 A1 * | 4/2023 | Sugita | .................. | H04N 23/663 |
| | | | | 348/345 |

FOREIGN PATENT DOCUMENTS

| | | |
|---|---|---|
| JP | H08194274 A | 7/1996 |
| JP | 2012133232 A | 7/2012 |
| JP | 2022189536 A | 12/2022 |

\* cited by examiner

*Primary Examiner* — Kelly L Jerabek
(74) *Attorney, Agent, or Firm* — Cowan, Liebowitz & Latman, P.C.

(57) ABSTRACT
An image processing apparatus includes a memory storing instructions, and a processor configured to execute the instructions to acquire first image data acquired by imaging via a first optical system and second image data acquired by imaging via a second optical system, and adjust an in-focus degree difference between the first image data and the second image data by performing, using one of the first image data and the second image data as reference image data, refocus processing for the other of the first image data and the second image data.

16 Claims, 10 Drawing Sheets

IMAGE PROCESSING APPARATUS FOR ACQUIRING A REFOCUS IMAGE, IMAGE PICKUP APPARATUS FOR ACQUIRING A REFOCUS IMAGE, IMAGE PROCESSING METHOD FOR ACQUIRING A REFOCUS IMAGE, AND STORAGE MEDIUM

BACKGROUND

Technical Field

One of the aspects of the embodiments relates to an image processing apparatus, an image pickup apparatus, an image processing method, and a storage medium.

Description of Related Art

One known technology acquires two images having parallax by imaging via two optical systems and stereoscopically displays the two images. A focus shift between two images for stereoscopic viewing, if any, can cause a user to feel uncomfortable during the stereoscopic viewing. Each of Japanese Patent Laid-Open Nos. 08-194274 and 2012-133232 discloses a method for adjusting a focus shift between two images having parallax (parallax images) during autofocusing (AF) for imaging.

The methods disclosed in Japanese Patent Laid-Open Nos. 08-194274 and 2012-133232 cannot adjust a focus shift between two images after they are captured.

SUMMARY

An image processing apparatus includes a memory storing instructions, and a processor configured to execute the instructions to acquire first image data acquired by imaging via a first optical system and second image data acquired by imaging via a second optical system, and adjust an in-focus degree difference between the first image data and the second image data by performing, using one of the first image data and the second image data as reference image data, refocus processing for the other of the first image data and the second image data. An image processing apparatus according to another aspect of the disclosure includes a memory storing instructions, and a processor configured to execute the instructions to acquire first image data acquired by imaging via a first optical system and second image data acquired by imaging via a second optical system, and switch between independently adjusting of refocus processing for the first image data and the second image data, and connectively adjusting of the refocus processing for the first image data and the second image data. An image pickup apparatus having the above image processing apparatus also constitutes another aspect of the disclosure. An image processing method corresponding to the above image processing apparatus and a storage medium storing a program that causes a computer to execute the above image processing method also constitute another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

System Configuration

Figure 1A:
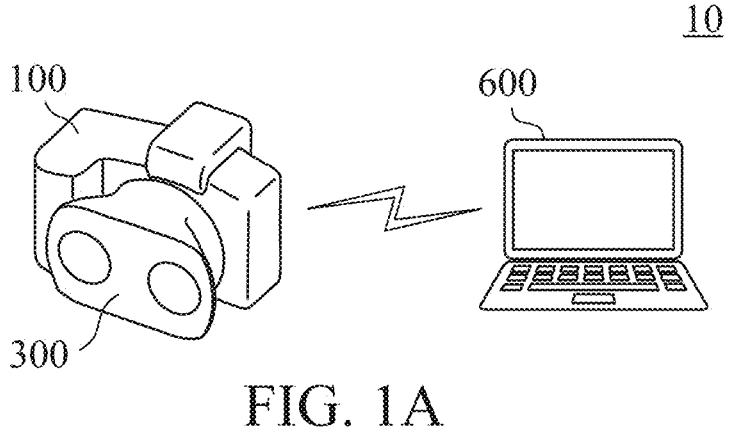
FIGS. 1A and 1B are schematic diagrams illustrating an example of the overall configuration of a system according to each embodiment.
Figure 1B:
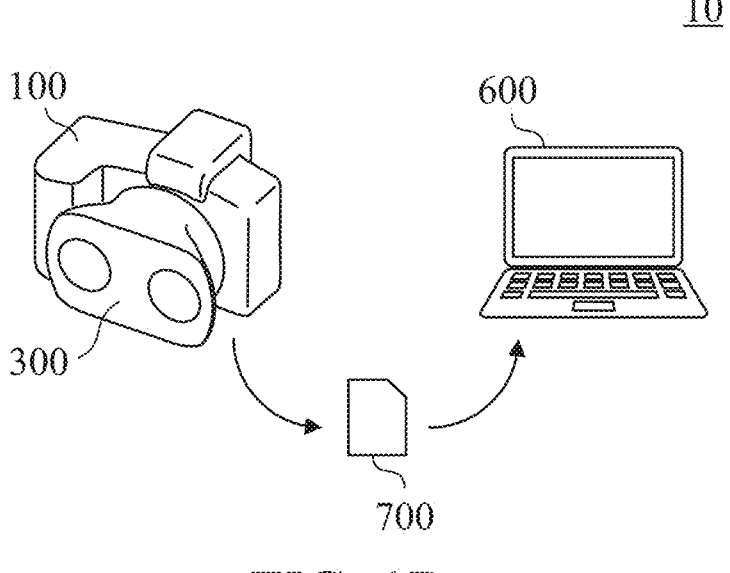

Referring now to FIGS. 1A and 1B, a description will be given of a system 10 according to this embodiment. FIGS. 1A and 1B are schematic diagrams illustrating an example of the overall configuration of the system 10. The system 10 includes a camera (image pickup apparatus) 100 and a personal computer (PC) 600. A lens apparatus 300 is attached to (connected to) the camera 100. Although details of the lens apparatus 300 will be described below, attaching the lens apparatus 300 to the camera 100 enables the camera 100 to capture two images (still images or moving images) having predetermined parallax at once. The PC 600 is an information processing apparatus that processes images captured by an image pickup apparatus such as the camera 100.

FIG. 1A illustrates a configuration in which the camera 100 and the PC 600 are communicably connected to each other by wireless or wire. FIG. 1B illustrates a configuration in which images captured by the camera 100 are input to the PC 600 via an external storage device (memory) 700 on a file basis. The external storage device 700 is connected to one or both of the camera 100 and the PC 600. For example, the external storage device 700 may be connected to the camera 100, and files of images captured with the camera 100 may be stored in the external storage device 700. Thereafter, the external storage device 700 may be detached from the camera 100 and connected to the PC 600, and the PC 600 may import the files stored in the external storage device 700.

Figure 2A:
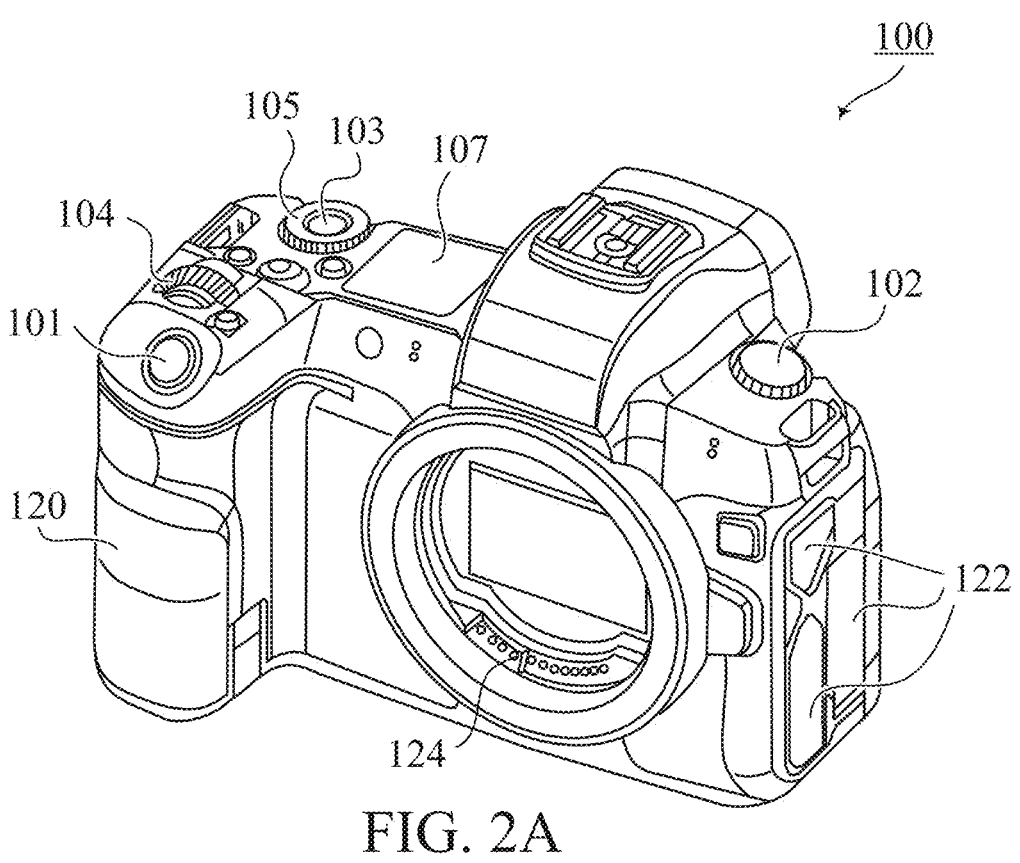
FIGS. 2A and 2B are external views of a camera according to each embodiment.
Figure 2B:
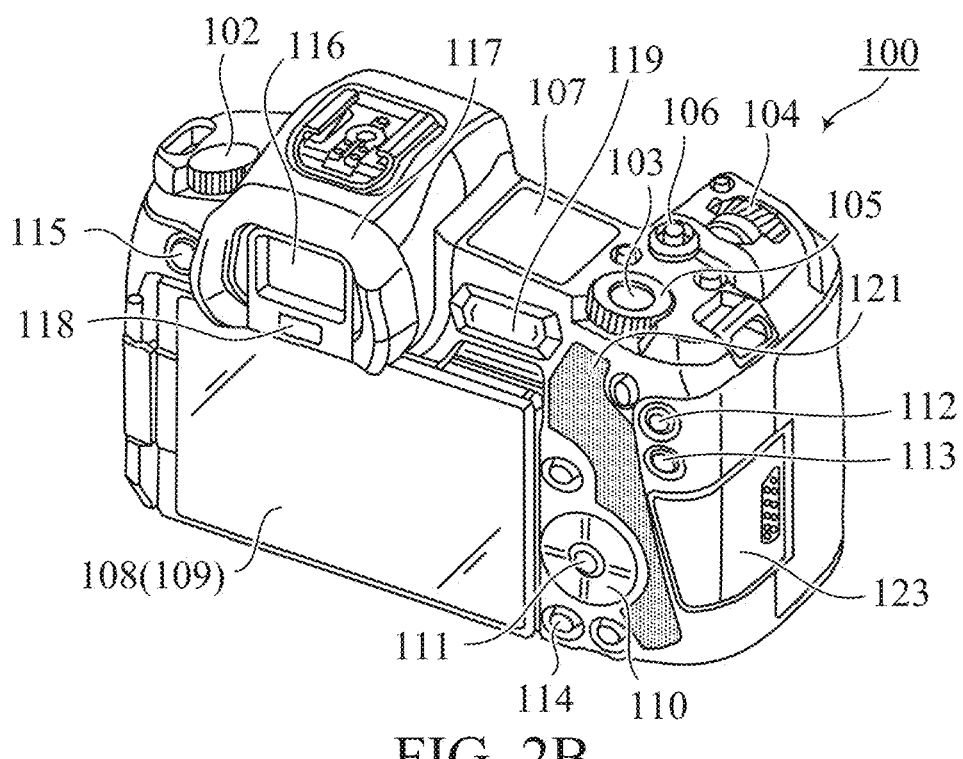

Referring now to FIGS. 2A and 2B, a description will be given of the external configuration of the camera 100. FIGS. 2A and 2B are external views of the camera 100. FIG. 2A is a perspective view of the camera 100 viewed from the front side, and FIG. 2B is a perspective view of the camera 100 viewed from the back side.

The camera 100 includes a shutter button 101, a power switch 102, a mode switch 103, a main electronic dial 104, a sub electronic dial 105, a moving image button 106, and an extra-finder (EF) display unit 107 on the top surface. The shutter button 101 is an operation member for issuing an imaging preparation instruction or an imaging instruction. The power switch 102 is an operation member that powers on and off the camera 100.

The mode switch 103 is an operation member for switching between various modes. The main electronic dial 104 is a rotary operating member for changing set values such as a shutter speed and an aperture value (F-number). The sub electronic dial 105 is a rotary operation member for moving a selection frame (cursor), forwarding an image, and the like. The moving image button 106 is an operation member for instructing to start or stop moving image capturing (recording). The extra-finder display unit 107 displays various setting values such as a shutter speed and an aperture value (F-number).

The camera 100 includes a display unit 108, a touch panel 109, a direction key 110, a setting button 111, an auto-exposure (AE) lock button 112, an enlargement button 113, a playback button 114, a menu button 115, an eyepiece unit 116, an eye proximity detector 118, and a touch bar 119 on the rear surface. The display unit 108 displays images and various information. The touch panel 109 is an operation member that detects a touch operation on a display surface (touch operation surface) of the display unit 108.

The direction key 110 is an operation unit including a key (four-direction key) that can be pressed in the up, down, left, and right directions. Processing can be performed according to the position where the direction key 110 is pressed. The setting button 111 is an operation member that is mainly pressed in order to determine a selection item. The AE lock button 112 is an operation member that is pressed to fix an exposure state in an imaging standby state.

The enlargement button 113 is an operation member for switching between turning on and turning off an enlargement mode in live-view display (LV display) in an imaging mode. In a case where the enlargement mode is turned on, the live-view image (LV image) is enlarged or reduced by operating the main electronic dial 104. The enlargement button 113 is used to enlarge a played image or increase an enlargement ratio in the enlargement mode.

The playback button 114 is an operation member for switching between the imaging mode and the playback mode. In the imaging mode, by pressing the playback button 114, the mode shifts to the playback mode, and the latest image among the images recorded on a recording medium 227, which will be described below, can be displayed on the display unit 108.

The menu button 115 is an operation member that is pressed to display a menu screen on the display unit 108 on which various settings can be made. The user can intuitively perform various settings using the menu screen displayed on the display unit 108, the direction key 110, and the setting button 111.

The eyepiece unit 116 is a part of the eyepiece viewfinder (peep type viewfinder) 117 that the user approaches the eyepiece and peep through it. The user can visually recognize an image displayed on an Electronic View Finder (EVF) 217 inside the camera 100, which will be described below, through the eyepiece unit 116. The eye proximity detector 118 is a sensor that detects whether or not the user's eye is close to the eyepiece unit 116 (eyepiece viewfinder 117).

The touch bar 119 is a line-shaped touch operation member (line touch sensor) that can accept touch operations. The touch bar 119 is located at a position that is touch-operable (touchable) with the user's right thumb while the user grips the grip portion 120 with the right hand (right pinky finger, ring finger, and middle finger) so that the user's right index finger can press the shutter button 101. That is, the touch bar 119 can be operated in a state (imaging orientation) in which the user approaches the eyepiece viewfinder 117, peeps through the eyepiece unit 116, and is ready to press the shutter button 101 at any time.

The touch bar 119 can accept a tap operation to it (an operation of touching and then releasing the touch without moving the touch position within a predetermined period), a sliding operation to the left or right (an operation of moving the touch position after the user touches the touch bar 119), etc. The touch bar 119 is an operation member different from the touch panel 109 and does not have a display function. The touch bar 119 functions, for example, as a multi-function bar (M-Fn bar) to which various functions can be assigned.

The camera 100 also includes the grip portion 120, a thumb rest portion 121, terminal covers 122, a lid 123, a communication terminal 124, and the like. The grip portion 120 is a holder with a shape that is easy to grip with the user's right hand when the user holds the camera 100. While the user holds the camera 100 by gripping the grip portion 120 with his right little finger, ring finger, and middle finger, the shutter button 101 and the main electronic dial 104 are disposed at positions where they can be operated with the user's right index finger. In a similar state, the sub electronic dial 105 and the touch bar 119 are disposed at positions that can be operated with the user's right thumb.

The thumb rest portion 121 (thumb standby position) is a grip portion (or area) provided on the back side of the camera 100 at a location where the right thumb can be easily placed while gripping the grip portion 120 without operating any operating member. The thumb rest portion 121 is made of a rubber member or the like to increase the holding force (grip feeling).

Terminal covers 122 protect connectors such as connection cables that connect the camera 100 to external devices (external apparatuses). The lid 123 protects the recording medium 227 and a slot for storing the recording medium 227 by closing the slot, which will be described below. The communication terminal 124 is a terminal for communicating with a lens apparatus (such as a lens apparatus 200 described below or a lens apparatus 300 illustrated in FIGS. 1A and 1B) that is attachable to and detachable from the camera 100.

Figure 3:
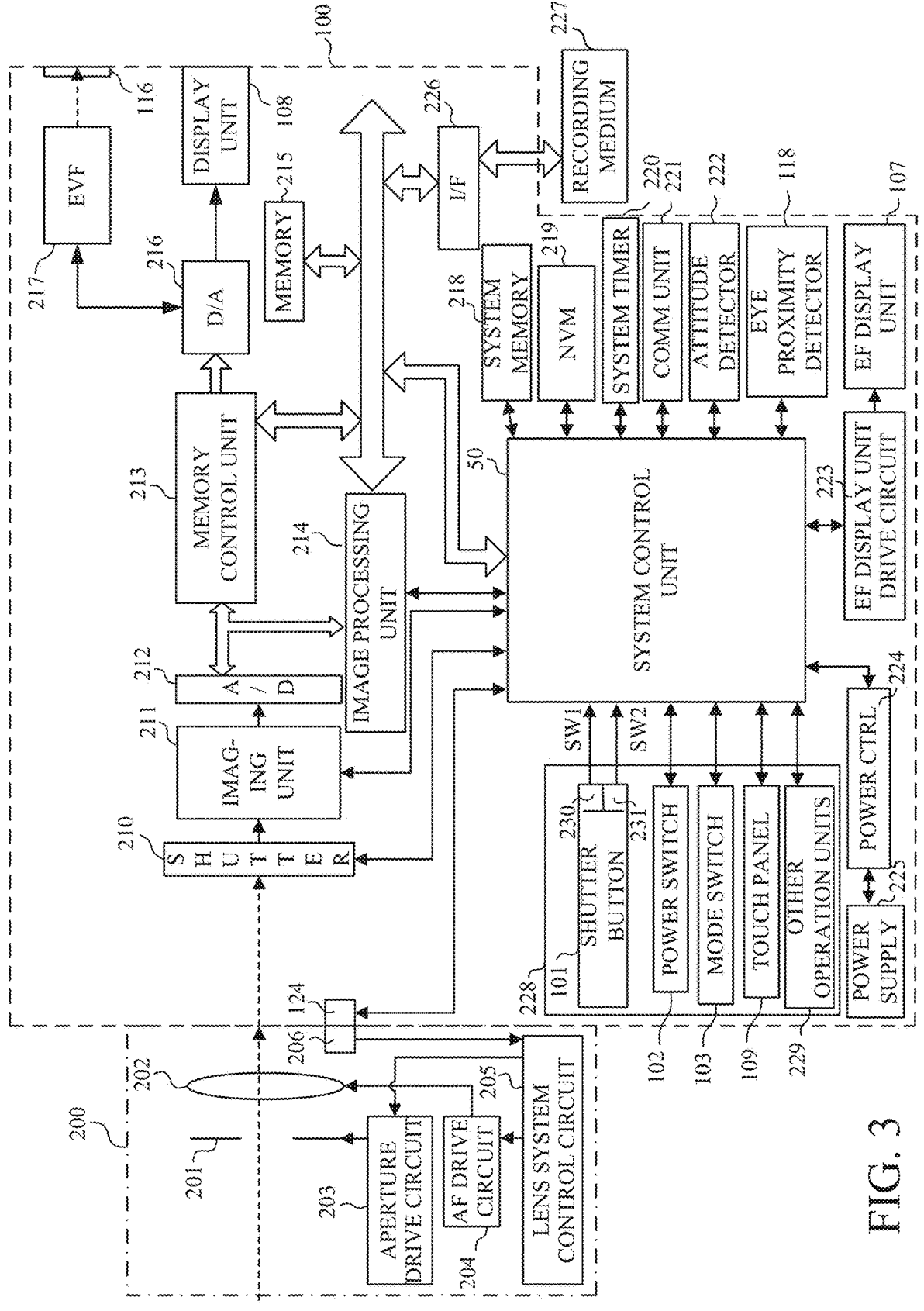
FIG. 3 is a block diagram of a camera according to each embodiment.

Referring now to FIG. 3, a description will be given of the internal configuration of the camera 100. FIG. 3 is a block diagram of camera 100. In FIG. 3, those elements, which are corresponding elements in FIGS. 2A and 2B, will be designated by the same reference numerals, and a description thereof will be omitted. In FIG. 3, a lens apparatus 200 is attached to the camera 100.

A description will now be given of the lens apparatus 200. The lens apparatus 200 is an interchangeable lens attachable to and detachable from the camera 100. The lens apparatus 200 is a monocular lens, and is an example of a normal lens. The lens apparatus 200 includes an aperture stop (diaphragm) 201, a lens 202, an aperture drive circuit 203, an AF drive circuit 204, a lens system control circuit 205, a communication terminal 206, and the like.

The aperture stop 201 is configured to adjust an aperture diameter. The lens 202 includes a plurality of lenses. The aperture drive circuit 203 adjusts a light amount by controlling the aperture diameter in the aperture stop 201. The AF drive circuit 204 drives the lens 202 during focusing.

The lens system control circuit 205 controls the aperture drive circuit 203, the AF drive circuit 204, etc. based on instructions from the system control unit 50, which will be described below. The lens system control circuit 205 controls the aperture stop 201 via the aperture drive circuit 203 and performs focusing by changing the position of the lens 202 via the AF drive circuit 204.

The lens system control circuit 205 can communicate with the camera 100. More specifically, communication is performed via the communication terminal 206 of the lens apparatus 200 and the communication terminal 124 of the camera 100. The communication terminal 206 is a terminal through which the lens apparatus 200 communicates with the camera 100.

A description will now be given of the camera 100. The camera 100 includes a shutter 210, an imaging unit 211, an A/D converter 212, a memory control unit 213, an image processing unit 214, a memory 215, a D/A converter 216, an EVF 217, a display unit 108, and a system control unit 50.

The shutter 210 is a focal plane shutter that can freely control the exposure time of the imaging unit 211 based on instructions from the system control unit 50. The imaging unit 211 is an image sensor, such as a CCD and CMOS device, which converts an optical image into an electrical signal. The imaging unit 211 may include an imaging-surface phase-difference sensor that outputs defocus amount information to the system control unit 50. The A/D converter 212 converts the analog signal output from the imaging unit 211 into a digital signal. The A/D converter 212 may be built into the imaging unit 211.

The image processing unit 214 performs predetermined processing (pixel interpolation, resizing processing such as reduction, color conversion processing, etc.) for data from the A/D converter 212 or data from the memory control unit 213. The image processing unit 214 performs predetermined calculation processing using captured image data, and the system control unit 50 performs exposure control and distance measurement control based on the acquired calculation result. Through this processing, through-the-lens (TTL) type AF processing, auto-exposure (AE) processing, pre-flash emission (EF) processing, etc. are performed. The image processing unit 214 performs predetermined calculation processing using the captured image data, and the system control unit 50 performs TTL type auto white balance (AWB) processing based on the acquired calculation result.

Image data from the A/D converter 212 is written into the memory 215 via the image processing unit 214 and the memory control unit 213. Alternatively, image data from the A/D converter 212 is written into the memory 215 via the memory control unit 213 without intervening the image processing unit 214. The memory 215 stores image data obtained by the imaging unit 211 and converted into digital data by the A/D converter 212, and image data to be displayed on the display unit 108 and EVF 217. The memory 215 has a storage capacity sufficient to store a predetermined number of still images, a predetermined period of moving images, and audio. The memory 215 also serves as an image display memory (video memory).

The D/A converter 216 converts the image data for display stored in the memory 215 into an analog signal and supplies it to the display unit 108 and the EVF 217. Therefore, the image data for display written in the memory 215 is displayed on the display unit 108 and the EVF 217 via the D/A converter 216.

The display unit 108 and EVF 217 perform display according to the analog signal from the D/A converter 216. The display unit 108 and the EVF 217 are, for example, display units such as an LCD or an organic EL display. The digital signal that has been A/D-converted by the A/D converter 212 and stored in the memory 215 is converted into an analog signal by the D/A converter 216, and is sequentially transferred to the display unit 108 or EVF 217 for display. Thereby, live-view display is performed.

The system control unit 50 is a control unit including at least one processor and/or at least one circuit. That is, the system control unit 50 may be a processor, a circuit, or a combination of a processor and a circuit. The system control unit 50 controls the camera 100 as a whole.

The system control unit 50 executes programs recorded in a nonvolatile memory (NVM) 219 to realize each processing in the flowchart described below. The system control unit 50 also performs display control by controlling the memory 215, the D/A converter 216, the display unit 108, the EVF 217, and the like.

The camera 100 further includes a system memory 218, the nonvolatile memory 219, a system timer 220, a communication (COMM) unit 221, an attitude detector 222, and an eye proximity detector 118.

For example, a RAM is used as the system memory 218. Constants and variables for the operations of the system control unit 50, programs read out of the nonvolatile memory 219, and the like are loaded in the system memory 218. The nonvolatile memory 219 is electrically erasable/recordable memory, and for example, an EEPROM is used as the nonvolatile memory 219.

The nonvolatile memory 219 records constants, programs, etc. for the operation of the system control unit 50. The program here is a program for executing a flowchart described below. The system timer 220 is a clock unit that measures the time used for various controls and the time of a built-in clock.

The communication unit 221 transmits and receives video signals and audio signals to and from external devices connected via wireless or wired cables. The communication unit 221 can also be connected to a wireless Local Area Network (LAN) and the Internet. The communication unit 221 can also communicate with external devices using Bluetooth (registered trademark) or Bluetooth (registered trademark) Low Energy. The communication unit 221 can transmit images captured by the imaging unit 211 (including live-view images) and images recorded on the recording medium 227, and can receive images and other various information from the external devices.

The attitude detector 222 detects the attitude (orientation) of the camera 100 relative to the gravity direction. Based on the attitude detected by the attitude detector 222, it is determined whether the image captured by the imaging unit 211 is an image captured with the camera 100 held horizontally or an image captured with the camera 100 held vertically. The system control unit 50 can add the attitude information according to the attitude detected by the attitude detector 222 to an image file of an image captured by the imaging unit 211, or rotates the image according to the detected attitude. For example, an acceleration sensor, a gyro sensor, or the like can be used for the attitude detector 222. Movement of the camera 100 (panning, tilting, lifting, whether it is stationary, etc.) can be detected using the attitude detector 222.

The eye proximity detector 118 can detect the proximity of an object to the eyepiece unit 116 (eyepiece viewfinder 117). For example, an infrared proximity sensor can be used as the eye proximity detector 118. In a case where an object approaches the eye proximity detector, infrared light emitted from a light projector in the eye proximity detector 118 is reflected by the object and is received by a light receiver of the infrared proximity sensor. The distance from the eyepiece unit 116 to the object can be determined based on the received infrared ray amount.

Thus, the eye proximity detector 118 performs eye proximity detection to detect the proximity distance of an object to the eyepiece unit 116. The eye proximity detector 118 is an eye proximity detection sensor that detects the approach and separation of the eye (object) from the eyepiece unit 116. In a case where an object is detected that approaches the eyepiece unit 116 within a predetermined distance from the non-proximity state, it is detected that the object is close to the eyepiece unit 116. On the other hand, in a case where the object whose approach was detected moves away from the proximity state (approach state) by a predetermined distance or more, it is detected that the eye has separated from the eye. A threshold for detecting the proximity and a threshold for detecting the separation may be different to provide hysteresis, for example. After the eye proximity is detected, the eye proximity is assumed unless eye separation is detected. After eye separation is detected, the eye separation state is assumed unless eye proximity is detected.

The system control unit 50 switches the display unit 108 and the EVF 217 between display (display state) and non-display (non-display state) according to the state detected by the eye proximity detector 118. More specifically, in a case where the camera is at least in an imaging standby state and the display destination switching setting is automatically switchable, the display destination during non-eye proximity is set to the display unit 108, display of the display unit 108 is turned on and display of the EVF 217 is turned off. During eye proximity, the display destination is set to the EVF 217, display of the EVF 217 is turned on, and display of the display unit 108 is turned off. The eye proximity detector 118 is not limited to an infrared proximity sensor, and another sensor may be used as long as it can detect a state that can be considered to be eye proximity.

The camera 100 further includes the extra-finder display unit 107, an extra-finder (EF) display drive circuit 223, a power control unit (CTRL) 224, a power supply unit 225, a recording medium interface (I/F) 226, an operation unit 228, and the like.

The extra-finder display unit 107 is driven by the extra-finder display drive circuit 223 and displays various setting values of the camera 100 such as a shutter speed and an aperture value. The power supply control unit 224 includes a battery detecting circuit, a DC-DC converter, a switch circuit for switching a block to which electricity is supplied, and the like, and detects whether or not a battery is attached, the type of battery, the remaining battery level, and the like. The power supply control unit 224 controls the DC-DC converter based on the detection result and the instruction from the system control unit 50, and supplies the necessary voltage to each unit including the recording medium 227 for a necessary period.

The power supply unit 225 is a primary battery such as an alkaline battery or a lithium battery, a secondary battery such as a NiCd battery, a NiMH battery, or a Li battery, an AC adapter, or the like. The recording medium I/F 226 is an interface with the recording medium 227 such as a memory card or a hard disk drive. The recording medium 227 is a memory card or the like for recording captured images, and includes a semiconductor memory, a magnetic disk, or the like. The recording medium 227 may be removably attached to the camera 100 or may be built into the camera 100.

The operation unit 228 is an input unit that accepts operations from the user (user operations) and is used to input various instructions to the system control unit 50. The operation unit 228 includes the shutter button 101, the power switch 102, the mode switch 103, the touch panel 109, other operation units 229, and the like. The other operation units 229 include the main electronic dial 104, sub electronic dial 105, moving image button 106, direction key 110, setting button 111, AE lock button 112, enlargement button 113, playback button 114, menu button 115, touch bar 119, etc.

The shutter button 101 includes a first shutter switch 230 and a second shutter switch 231.

The first shutter switch 230 is turned on when the shutter button 101 is half-pressed (instruction to prepare for imaging) during operation of the shutter button 101, and outputs first shutter switch signal SW1. The system control unit 50 starts imaging preparation processing such as AF processing, AE processing, AWB processing, and EF processing according to the first shutter switch signal SW1.

The second shutter switch 231 is turned on when the operation of the shutter button 101 is completed, or the shutter button 101 is so-called fully pressed (imaging instruction), and outputs the second shutter switch signal SW2. According to the second shutter switch signal SW2, the system control unit 50 starts a series of imaging processing from reading out signals from the imaging unit 211 to generating an image file containing the captured image and writing it into the recording medium 227.

The mode switch 103 switches the operation mode of the system control unit 50 to any one of still image capturing mode, moving image capturing mode, playback mode, etc. Modes included in the still image capturing mode include an automatic imaging mode, an automatic scene discrimination mode, a manual mode, an aperture priority mode (Av mode), a shutter speed priority mode (Tv mode), and a program AE mode (P mode).

There are various scene modes, custom modes, etc. that provide imaging settings for each imaging scene. The user can directly switch to any of the above imaging modes using the mode switch 103. The user can switch to the imaging mode list screen using the mode switch 103, and then selectively switch to any of the displayed modes using the operation unit 228. Similarly, the moving image capturing mode may also include a plurality of modes.

The touch panel 109 is a touch sensor that detects various touch operations on the display surface of the display unit 108 (the operation surface of the touch panel 109). The touch panel 109 and the display unit 108 can be integrated. For example, the touch panel 109 is attached to an upper layer of the display surface of the display unit 108 so that the light transmittance does not interfere with the display on the display unit 108. Associating the input coordinates on the touch panel 109 with the display coordinates on the display surface of the display unit 108 can form a graphical user interface (GUI) as if the user could directly operate the screen displayed on the display unit 108.

The touch panel 109 can use any one of various methods, such as a resistive film method, a capacitive method, a surface acoustic wave method, an infrared method, an electromagnetic induction method, an image recognition method, and an optical sensor method. Depending on the method, methods can be used that detect a touch when there is contact with the touch panel 109, and when a finger or pen approaches the touch panel 109, but any method can be used.

The system control unit 50 can detect the following operations or states on the touch panel 109:

A finger or a pen that has not touched the touch panel 109 newly touches the touch panel 109, that is, the start of a touch (referred to as Touch-down hereinafter);

A state in which the touch panel 109 is touched with a finger or a pen (referred to as Touch-on hereinafter);

A finger or pen that has touched the touch panel 109 moves away from the touch panel 109 (referred to as Touch-move hereinafter);

A finger or pen that has touched the touch panel 109 is removed from the touch panel 109 (released), that is, the touch ends (referred to as Touch-up hereinafter); and A state in which nothing is touched on the touch panel 109 (referred to as Touch-off hereinafter).

In a case where Touch-down is detected, Touch-on is also detected at the same time. After Touch-down is made, Touch-on typically continues to be detected unless Touch-up is detected. In a case where Touch-move is detected, Touch-on is also detected at the same time. Even if Touch-on is detected, if the touch position does not move, Touch-move is not detected. After all touching fingers or pens are detected to have touched-up, Touch-off occurs.

These operations/states and the coordinates of the position where the finger or pen is touching on the touch panel 109 are notified to the system control unit 50 through the internal bus. The system control unit 50 determines what kind of operation (touch operation) has been performed on the touch panel 109 based on the notified information. Regarding touch movements, a moving direction of a finger or pen on the touch panel 109 can also be determined for each vertical component and horizontal component on the touch panel 109 based on changes in position coordinates. In a case where it is detected that a touch move has been made over a predetermined distance, it is determined that a slide operation has been performed.

A flick is an operation in which a finger touching the touch panel 109 quickly moves a certain distance, and then releases. In other words, the flick is an operation in which a finger is quickly traced on the touch panel 109 as if it flicks. In a case where Touch-move is detected over a predetermined distance and at a predetermined speed or higher, and Touch-up is detected as it is, it is determined that a flick has been performed (it can be determined that a flick has occurred following a slide operation).

A pinch-in is a touch operation in which multiple points (such as two points) are touched together (multi-touch) and the touch positions are brought closer to each other, and a pinch-out is a touch operation in which the touch positions are moved away from each other. Pinch-out and pinch-in are collectively called a pinch operation (or simply pinch).

Figure 4:
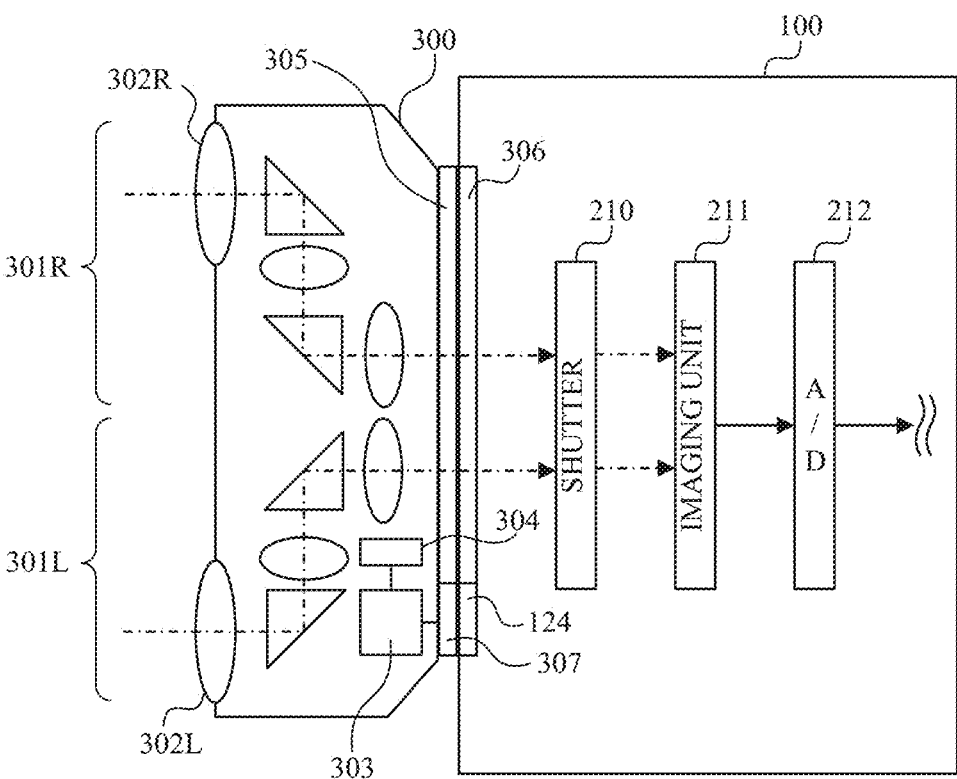
FIG. 4 is a configuration diagram of a lens apparatus according to each embodiment.

Referring now to FIG. 4, a description will be given of the lens apparatus 300. FIG. 4 is the configuration diagram of the lens apparatus 300. FIG. 4 illustrates a state in which the lens apparatus 300 is attached to the camera 100. In the camera 100 illustrated in FIG. 4, those elements, which are corresponding elements in FIG. 3, will be designated by the same reference numerals.

The lens apparatus 300 is an interchangeable lens that can be attached to and detached from the camera 100. The lens apparatus 300 includes two imaging optical systems that can capture a right image and a left image with parallax. In this embodiment, the lens apparatus 300 has two optical systems, and each of the two optical systems can image a wide field angle range of approximately 180 degrees. More specifically, each of the two optical systems of the lens apparatus 300 can capture an object at a field angle (angle of view) of 180 degrees in the horizontal direction (horizontal angle, azimuth angle, yaw angle) and 180 degrees in the vertical direction (vertical angle, elevation angle, pitch angle). In other words, each of the two optical systems can image a range of the front hemisphere.

The lens apparatus 300 includes a right-eye optical system 301R having a plurality of lenses, a mirror, etc., a left-eye optical system 301L having a plurality of lenses, a mirror, etc., a lens system control circuit 303, and an AF drive circuit 304. The right-eye optical system 301R is an example of a first optical system, and the left-eye optical system 301L is an example of a second optical system. The right-eye optical system 301R has a lens 302R placed on the object side, and the left-eye optical system 301L has a lens 302L placed on the object side. The lens 302R and lens 302L face the same direction, and their optical axes are approximately parallel.

The lens system control circuit 303 controls the AF drive circuit 304 and the like. The lens system control circuit 303 focuses on the object by changing the positions of the right-eye optical system 301R and the left-eye optical system 301L via the AF drive circuit 304. In each embodiment, the AF drive circuit 304 controls the right-eye optical system 301R and the left-eye optical system 301L to connectively or connectedly operate together. That is, focusing is made for the entire lens apparatus 300, and the focusing does not cause a focus shift between a right image and a left image. The focus shift between the right image and the left image can be finely adjusted by an unillustrated adjustment unit in FIG. 4, and can be adjusted in advance to the start of imaging.

The lens apparatus 300 is a binocular lens (VR180 lens) for obtaining a VR180 image, which is one of the formats of Virtual Reality (VR) images that enable binocular stereoscopic view. In this embodiment, the lens apparatus 300 has a fisheye lens capable of capturing a range of approximately 180 degrees in each of the right-eye optical system 301R and the left-eye optical system 301L. A capturable range by the lenses of each of the right-eye optical system 301R and the left-eye optical system 301L may be about 160 degrees, which is narrower than the 180-degree range.

The lens apparatus 300 allows a right image (first image) formed via the right-eye optical system 301R and a left image (second image) formed via the left-eye optical system 301L to be imaged onto one or two image sensors in the camera to which the lens apparatus 300 has been attached.

The lens apparatus 300 is attached to the camera 100 via a lens mount unit 305 and a camera mount unit 306 of the camera 100. Thus, the system control unit 50 of the camera 100 and the lens system control circuit 303 of the lens apparatus 300 are electrically connected via the communication terminal 124 of the camera 100 and the communication terminal 307 of the lens apparatus 300.

Figure 5:
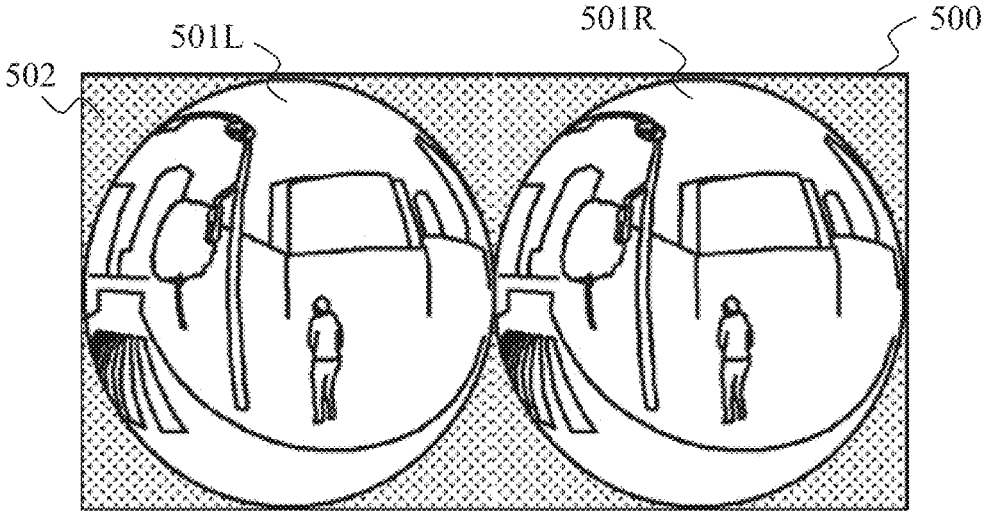
FIG. 5 is a schematic diagram illustrating the characteristics of captured images according to each embodiment.

Referring now to FIG. 5, a description will be given of the characteristics of an image (captured image) 500 captured by the camera 100 according to each embodiment. FIG. 5 is a schematic diagram illustrating the characteristics of the image 500. In this embodiment, a right image formed via the right-eye optical system 301R and a left image formed via the left-eye optical system 301L are simultaneously (as a set) captured (imaged) by the imaging unit 211 of the camera 100. That is, two optical images, first image 501R and second image 501L, are formed by right-eye optical system 301R and left-eye optical system 301L on the single image sensor 502.

The imaging unit 211 converts the formed object images (optical signals) into analog electrical signals. Using the lens apparatus 300 in this way can simultaneously capture two (a set of) images with parallax (first image and second image) from two locations (optical systems): the right-eye optical system 301R and the left-eye optical system 301L. Dividing the acquired images into an image for the left eye and an image for the right eye and displaying them in VR, the user can view a three-dimensional VR image in a range of approximately 180 degrees.

Figure 6:
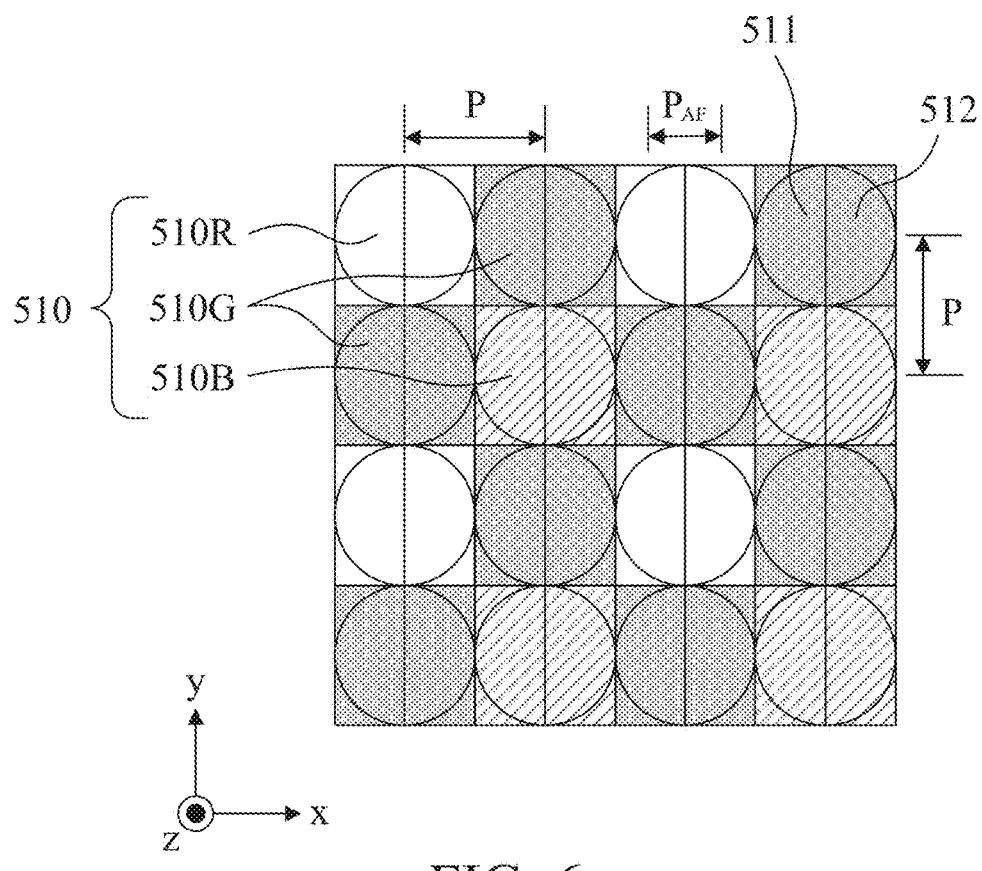
FIG. 6 is a pixel array diagram according to each embodiment.

Referring now to FIG. 6, a description will be given of an example pixel array on the image sensor 502. FIG. 6 is a pixel array diagram of the image sensor 502, and typically illustrates an area in which pixels are arranged so that four pixels are arranged in a row (horizontally) and four pixels are arranged in a column (vertically). The image sensor 502 is configured to divide a pupil area in the imaging optical system in a pupil dividing direction and to generate a plurality of image signals (parallax images) from signals based on light beams that have passed through mutually different pupil areas (pupil division areas). More specifically, the photoelectric conversion area of each pixel is divided into two in the horizontal direction (pupil dividing direction), and each photoelectric conversion area functions as a subpixel. Therefore, FIG. 6 also illustrates an area in which eight subpixels are arranged horizontally and four subpixels are arranged vertically.

In this embodiment, a 2×2 pixel unit 510 at the upper left of FIG. 6 corresponds to a repetitive unit of a primary color Bayer array color filter provided in the image sensor 502. Therefore, a pixel 510R with a spectral sensitivity of R (red) is placed in the upper left corner, a pixel 510G with a spectral sensitivity of G (green) is placed in the upper right and lower left corners, and a pixel 510B with a spectral sensitivity of B (blue) is placed in the lower right corner.

As typically illustrated at the upper right pixel of FIG. 6, each pixel has a photoelectric conversion unit equally divided into 2 horizontal pixels×1 vertical pixel, and the left half photoelectric conversion unit can be used as a first subpixel 511, the right half photoelectric conversion unit can be used as a second subpixel 512. One image obtained by acquiring the output of the subpixel 511 and one image obtained by acquiring the output of the subpixel 512 constitute a set of viewpoint images. Therefore, the camera 100 can generate two viewpoint images by single imaging.

Adding (totaling) the signals obtained from the first subpixel 511 and the second subpixel 512 in each pixel can provide a pixel signal of one normal pixel without pupil division. That is, the first image described below is an image obtained by adding up a first parallax image and a second parallax image, and the second image described below is an image obtained by adding up a third parallax image and a fourth parallax image.

In this embodiment, the circuit of each pixel corresponding to each microlens includes a common charge accumulation portion (floating diffusion unit: FD unit) among a plurality of pupil-divided photoelectric converters. Therefore, by controlling the transfer of electric charges to the FD unit and the reset of electric charges in the FD unit, a pixel signal based on the charges from each subpixel and a pixel signal based on the charges from each subpixel are mixed and an output pixel signal can be output.

Here, for convenience, optical images based on the light beams that have passed through different pupil division areas and entered subpixels will be referred to as A image and B image, signals (charges) based on the optical images will be referred to as A image signal, B image signal, and a signal obtained by mixing these signals from the subpixels will be referred to as an (A+B) image signal.

In this embodiment, in the normal imaging mode, only the (A+B) image signal is read out during imaging. In the multi-view imaging mode, the A image signal is read out in addition to the (A+B) image signal. In recording in each imaging mode, image data corresponding to each read image signal is recorded.

Figure 7:
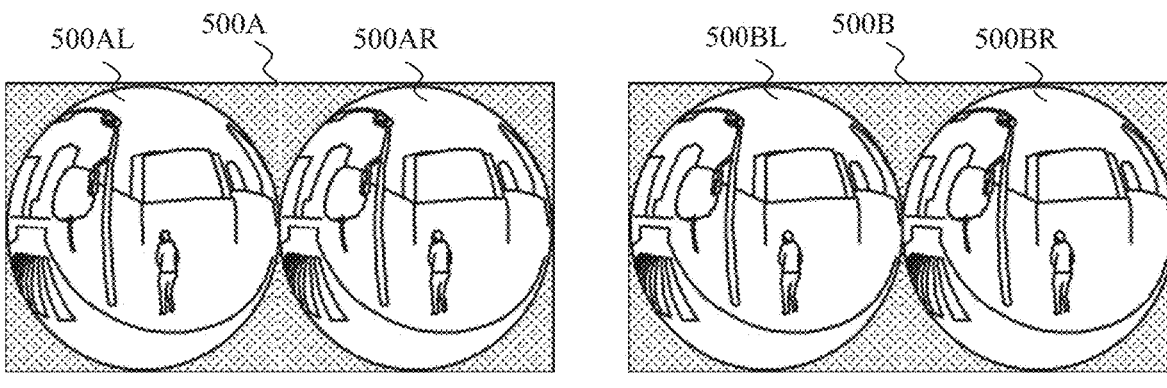
FIG. 7 is a schematic diagram illustrating images included in captured images in a multi-view imaging mode according to each embodiment.

Referring now to FIG. 7, a description will be given of images additionally included in the image 500, which have been captured in the multi-view imaging mode. FIG. 7 is a schematic diagram of images additionally included in the image 500, which have been imaged in the multi-view imaging mode. In addition to the (A+B) image (image 500) illustrated in FIG. 5, the image 500 includes an A image 500A and a B image 500B.

The A image 500A includes an image (first parallax image) 500AR formed by the right-eye optical system and an image (third parallax image) 500AL formed by the left-eye optical system. Similarly, the B image 500B includes an image (second parallax image) 500BR formed by the right-eye optical system and an image (fourth parallax image) 500BL formed by the left-eye optical system. The image 500AR and the image 500BR have parallax with each other, and the image 500AL and the image 500BL have parallax with each other. In the first embodiment and second embodiment, which will be described below, a description will be made on the premise that imaging is performed in the multi-view imaging mode.

Figure 8:
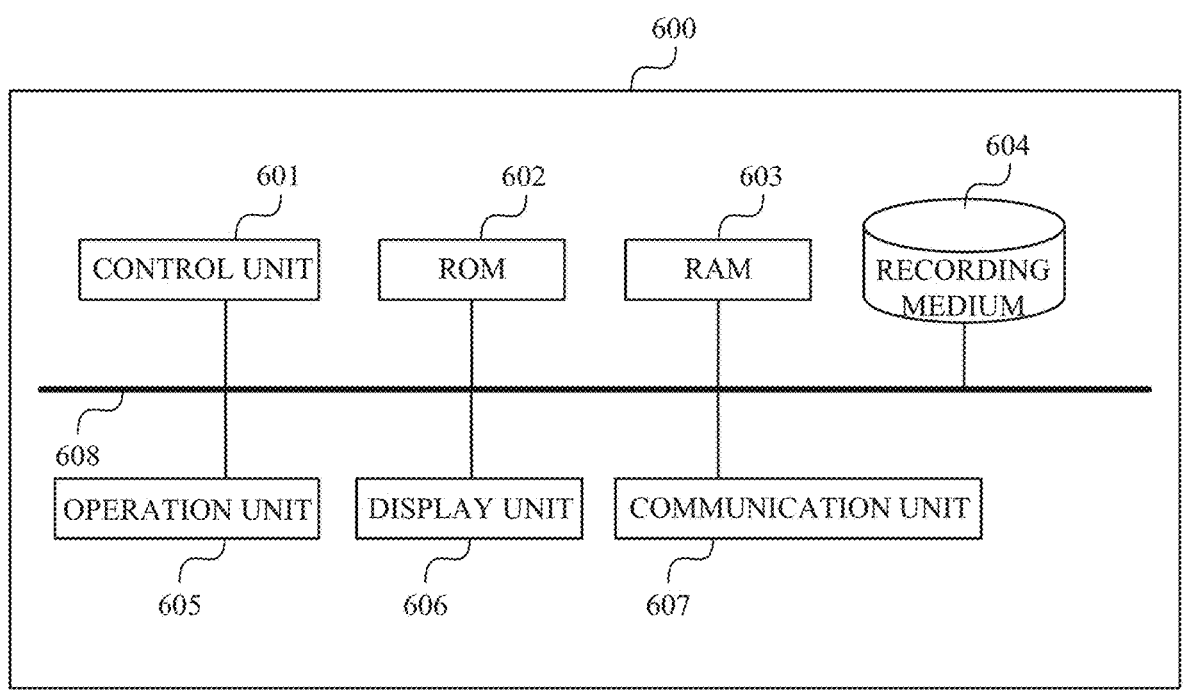
FIG. 8 is a block diagram of a personal computer (PC) according to each embodiment.

Referring now to FIG. 8, a description will be given of the internal configuration of the PC 600. FIG. 8 is a block diagram of the PC 600. A control unit 601 is, for example, a central processing unit (CPU), and controls the entire PC 600. A Read Only Memory (ROM) 602 non-temporarily stores programs and parameters. A Random Access Memory (RAM) 603 temporarily stores programs and data supplied from external devices. A recording medium 604 is a hard disk drive or flash memory fixedly installed in the PC 600, or an optical disc, a magnetic card, an optical card, an IC card, a memory card, etc. that is removable from the PC 600. A file of an image captured by the camera 100 is read out of the recording medium 604.

An operation unit 605 accepts user operations on the PC 600. The operation member that is used by the user performing an operation may be a button or a touch panel provided on the PC 600, or may be a keyboard, a mouse, etc. that is detachable from the PC 600. A display unit 606 displays data stored by the PC 600, data supplied from the outside, and the like. The display unit 606 may be a part of the PC 600 or may be a display unit separate from the PC 600. A communication unit 607 communicates with external devices such as the camera 100. A system bus 608 communicatively connects the components in the PC 600.

In the processing unit (image processing apparatus) of the PC 600 in each embodiment described below, the control unit 601 loads and executes a predetermined program stored in the ROM 602 into the work RAM 603, and each unit performs a predetermined operation based on instructions from the control unit 601. Although each embodiment will be described on the assumption that processing is performed in the PC 600, the camera 100 can have components similarly to the PC 600 and the camera 100 can perform similar processing. Each embodiment will be described below.

First Embodiment

Figure 9:
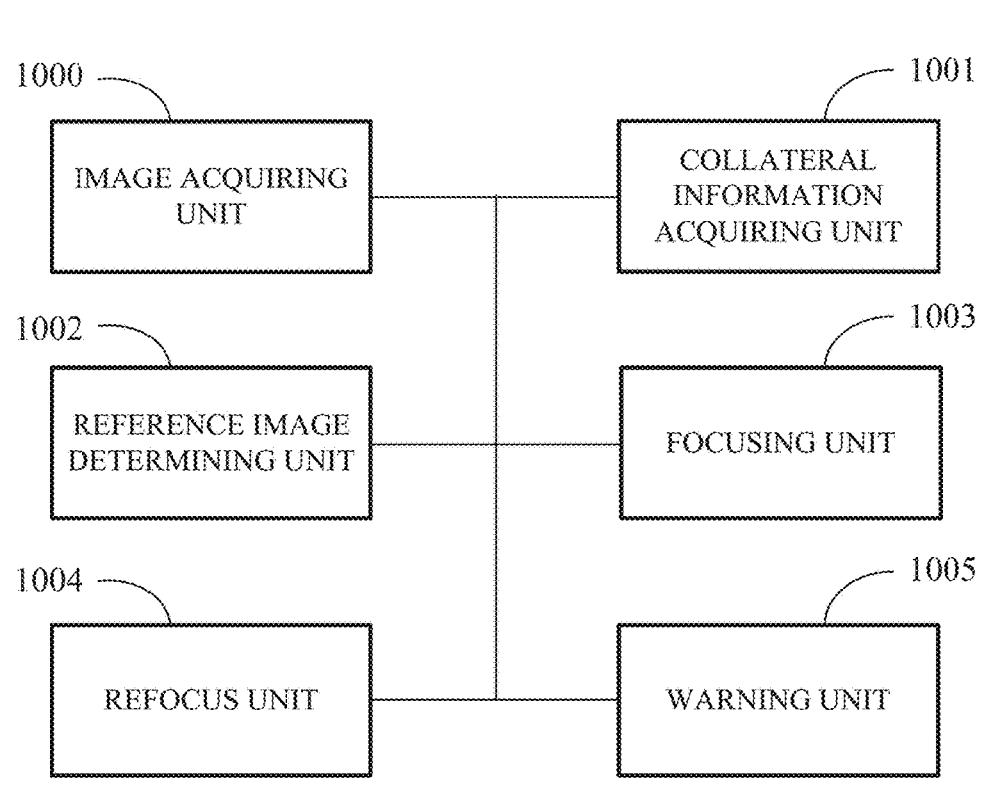
FIG. 9 is a block diagram of a processing unit in the PC according to the first embodiment.

Referring now to FIG. 9, a description will be given of a processing unit (image processing apparatus) 900 included in the PC 600 according to a first embodiment. FIG. 9 is a block diagram of the processing unit (image processing apparatus) 900.

The image acquiring unit 1000 acquires an image file stored in the recording medium 604. That is, the image acquiring unit 1000 acquires first image data by imaging via a first optical system (such as a right-eye optical system) and second image data by imaging via a second optical system (such as a left-eye optical system). In this embodiment, the image acquiring unit 1000 can acquire the following six images from the image file (first image data and second image data) captured in the multi-view imaging mode:

three images including (A+B) image (first image), A image (first parallax image), and B image (second parallax image) captured by the right-eye optical system; and three images including (A+B) image (second image), A image (third parallax image), and B image (fourth parallax image) captured by the left-eye optical system.

A collateral information acquiring unit 1001 acquires collateral information recorded in correspondence with the image file. The collateral information includes imaging information such as a shutter speed and an aperture value during imaging, information on the attitude of the camera during imaging, AF information, and the like. In this embodiment, the AF information includes AF optical system information indicating which of the right-eye optical system and the left-eye optical system performed AF, and coordinate position information where AF was performed. Although the collateral information is recorded in the same image file in this embodiment, the collateral information may be recorded in a separate file associated with the image file.

The reference image determining unit 1002 determines an image (reference image, reference image data) to be set to a reference in a focusing unit 1003, which will be described below. In this embodiment, the reference image determining unit 1002 determines, as a reference image, an image formed by an optical system that has performed AF based on AF optical system information included in the collateral information. The image formed by the optical system that has performed AF is more likely to be in focus than that of an optical system that has not performed AF, so an image formed by an optical system that has performed AF may be selected as the reference image.

The method for determining the reference image is not limited to the method described above. For example, the in-focus degrees at the AF coordinates (predetermined position) of the (A+B) image formed by the right-eye optical system and the (A+B) image formed by the left-eye optical system may be calculated using a known method, and a more in-focus image formed by the optical system may be determined as the reference image. Hereinafter, the image formed by the optical system (the other of the first image data and the second image data) that is not selected as the reference image (one of the first image data and the second image data) will be referred to as an adjustment image.

The focusing unit 1003 performs refocus processing for the adjustment image using a refocus unit 1004, which will be described below. That is, the focusing unit 1003 adjusts an in-focus degree difference (or focus shift) between the first image data and the second image data by performing the refocus processing for at least one of the first image data and the second image data.

More specifically, the focusing unit 1003 calculates the in-focus degree of each of the reference image and the adjustment image at the AF coordinates. The focusing unit 1003 performs refocus processing so that the in-focus degree of the adjustment image falls within a predetermined range with respect to the reference image (so as to adjust the in-focus degree difference between the reference image and the adjustment image). The refocus unit 1004 performs refocus processing using the A image (first parallax image or third parallax image) and the B image (second parallax image or second parallax image), which are parallax images of the optical system (first optical system or second optical system) of the adjustment image.

The refocus unit 1004 can perform refocus processing for the first image using the first parallax image and the second parallax image, and can perform refocus processing for the second image using the third parallax image and the fourth parallax image. The first parallax image and the second parallax image are images corresponding to light beams passing through mutually different pupil areas in the first optical system, and the third parallax image and the fourth parallax image are images corresponding to light beams passing through mutually different pupil areas in the second optical system.

Thus, the refocus unit 1004 can perform refocus processing for each of the first image data and the second image data independently. The refocus processing method is not particularly limited, and any known method can be used. A warning unit 1005 displays a warning on the display unit 606.

Figure 10:
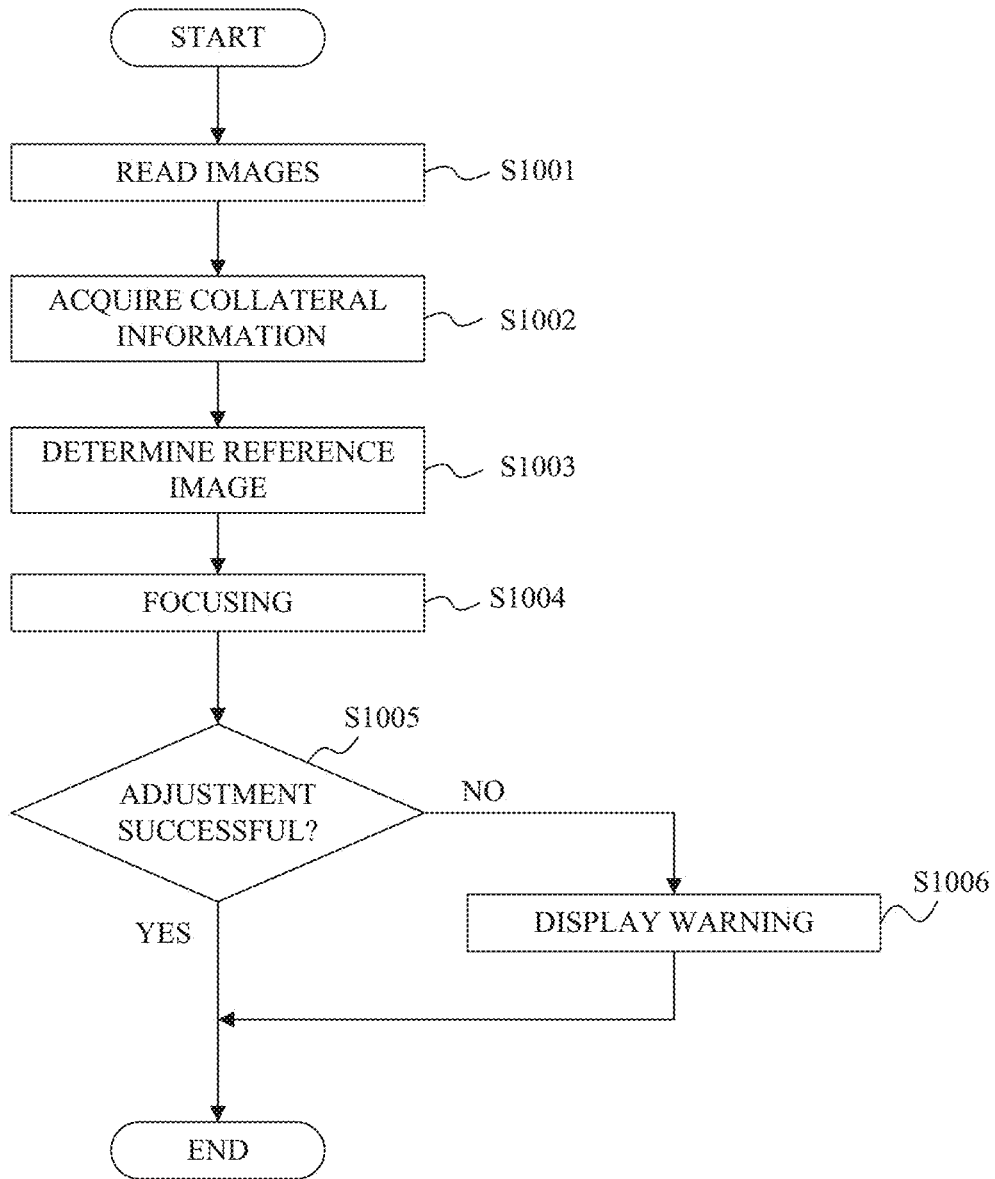
FIG. 10 is a flowchart illustrating an operation procedure according to the first embodiment.

Referring now to FIG. 10, a description will be given of the operation (image processing method) of the processing unit 900 according to this embodiment. FIG. 10 is a flowchart illustrating the operation procedure of the processing unit 900.

In step S1001, the image acquiring unit 1000 acquires an image, for example, from the recording medium 604 (reads the image).

In step S1002, the collateral information acquiring unit 1001 acquires collateral information.

In step S1003, the reference image determining unit 1002 determines a reference image and an adjustment image.

In step S1004, the focusing unit 1003 performs focusing for the adjustment image so that the reference image and the adjustment image are in focus (so that their in-focus degrees are approximately or substantially equal to each other).

In step S1005, the focusing unit 1003 determines whether the in-focus degrees of the reference image and the adjustment image fall within a predetermined range and whether the adjustment has been successful.

In a case where it is determined that the adjustment has failed (in a case where it is determined that the focusing unit 1003 cannot adjust the in-focus degree difference between the first image data and the second image data), the flow proceeds to step S1006. On the other hand, in a case where it is determined that the adjustment has been successful, this flow ends.

In step S1006, the warning unit 1005 displays on the display unit 600 that the adjustment has failed (displays a warning). Thereafter, this flow ends.

In this embodiment, a warning is displayed in step S1006, but this embodiment is not limited to this example, and for example, the processing may be switched to the second embodiment described below. In this embodiment, the refocus processing is performed by setting one of the first image data and the second image data to the adjustment image data, but this embodiment is not limited to this example, and refocus processing may be performed for both of the first image data and the second image data.

This embodiment can reduce a focus shift between the image formed by the right-eye optical system and the image formed by the left-eye optical system in images captured in the multi-view imaging mode.

Second Embodiment

Figure 11:
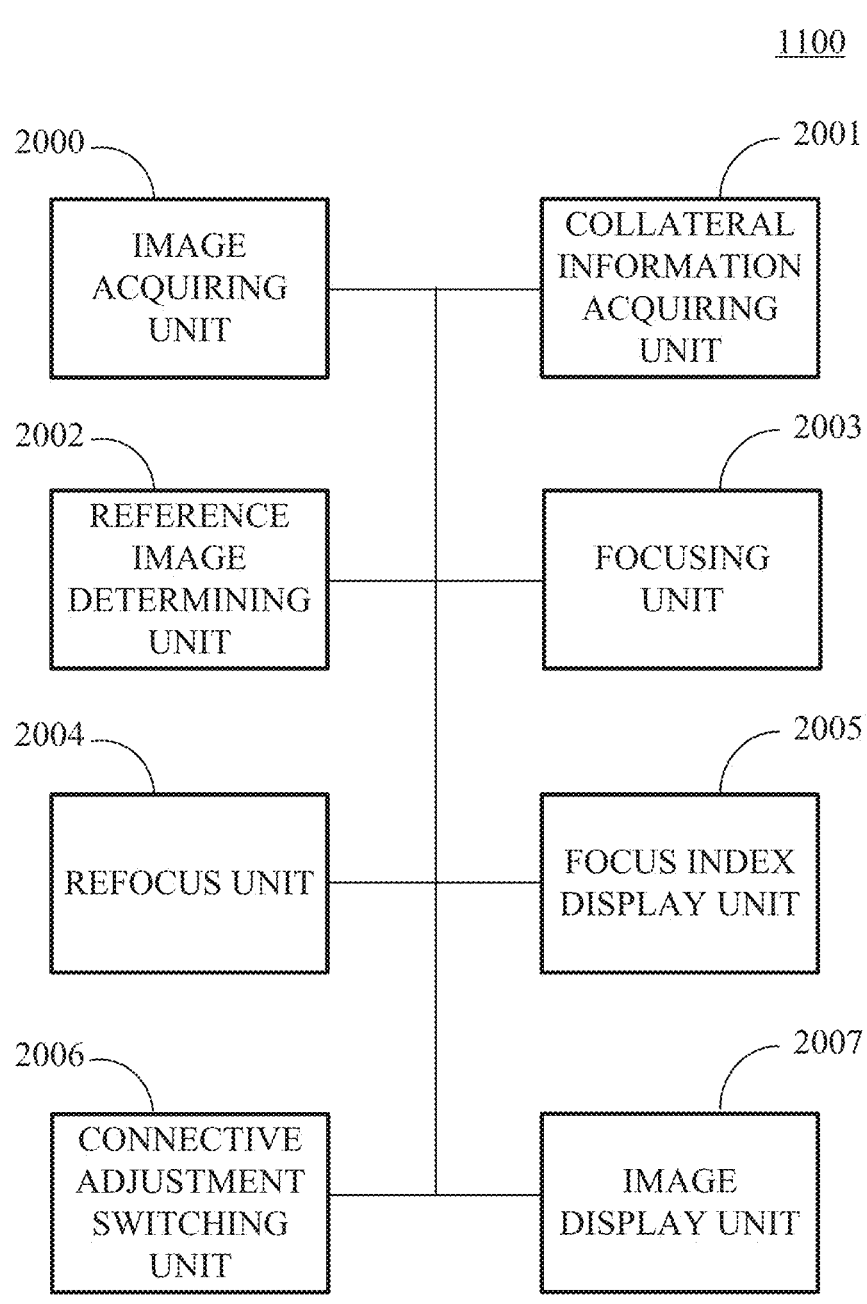
FIG. 11 is a block diagram of a processing unit in a PC according to a second embodiment.
Figure 12:
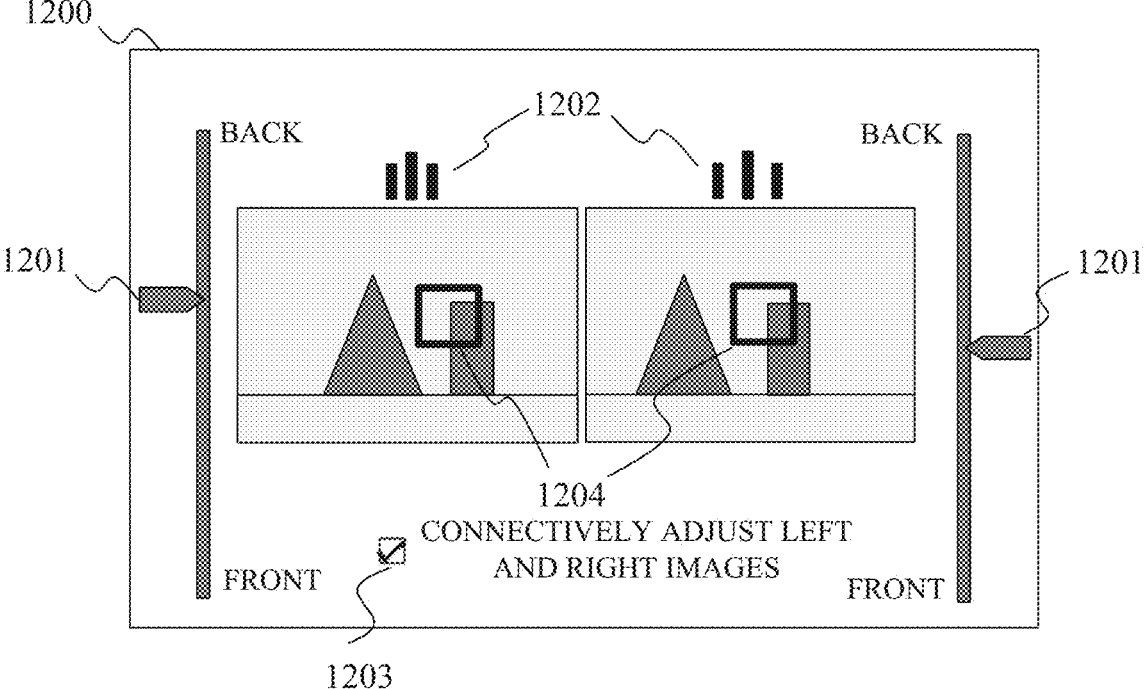
FIG. 12 is an example of a user interface (UI) screen according to the second embodiment.

Referring now to FIGS. 11 and 12, a description will be given of a processing unit (image processing apparatus) 1100 included in the PC 600 according to a second embodiment. FIG. 11 is a block diagram of the processing unit (image processing apparatus) 1100. FIG. 12 is an example of a user interface (UI) screen (screen 1200) displayed to the user. This embodiment will omit a description common to that of the first embodiment.

An image acquiring unit 2000 acquires an image file stored in the recording medium 604. That is, the image acquiring unit 2000 acquires a first image data obtained by imaging through a first optical system (such as a right-eye optical system) and a second image data obtained by imaging through a second optical system (such as a left-eye optical system).

In this embodiment, the image acquiring unit 2000 can acquire the following six images from the image file (first image data and second image data) captured in multi-view imaging mode:

three images including (A+B) image (first image), A image (first parallax image), and B image (second parallax image) captured by the right-eye optical system; and three images including (A+B) image (second image), A image (third parallax image), and B image (fourth parallax image) captured by the left-eye optical system A collateral information acquiring unit 2001 acquires collateral information recorded in correspondence with the image file. The collateral information includes imaging information such as a shutter speed and an aperture value during imaging, information on the attitude of the camera during imaging, AF information, and the like.

In this embodiment, the AF information includes AF optical system information indicating which of the right-eye optical system and the left-eye optical system performed AF, and coordinate position information where AF was performed. In this embodiment, the collateral information is recorded in the same image file, but the collateral information may be recorded in a separate file associated with the image file.

A reference image determining unit 2002 determines an image to be set to a reference in a focusing unit 2003, which will be described below. In this embodiment, the reference image determining unit 2002 determines, as a reference image, an image formed by the optical system that has performed AF based on the AF optical system information included in the collateral information. The image formed by the optical system that has performed AF is more likely to be in focus than that of an optical system that has not performed AF, so an image formed by an optical system that has performed AF may be selected.

The method for determining the reference image is not limited to the method described above. For example, the in-focus degrees at the AF coordinates (AF frame 1204 in FIG. 12) of the (A+B) image formed by the right-eye optical system and the (A+B) image formed by the left-eye optical system may be calculated using a known method, and a more in-focus image formed by the optical system may be determined as the reference image. Hereinafter, the image formed by the optical system that is not selected as the reference image will be referred to as an adjustment image.

The focusing unit 2003 performs refocus processing using the refocus unit 2004 according to the adjustment values of adjustment sliders 1201 in FIG. 12. The refocus unit 2004 performs refocus processing using image A (first parallax image or third parallax image) and image B (second parallax image or fourth parallax image), which are parallax images of each optical system. The refocus processing method is not particularly limited, and any known method can be used.

A focus index display unit 2005 calculates the in-focus degree (in-focus degree) of the adjustment image by the focusing unit 2003 using a known method, and displays it on the display unit 606 according to the in-focus degree. That is, the focus index display unit 2005 displays indices indicating the in-focus degrees of the first image data and the second image data. In this embodiment, for example, focus indicator displays 1202 in FIG. 12 is displayed. In the focus indicator displays 1202, the closer the two left and right bars are to the central bars, the higher the in-focus degree is.

A connective (or connected) adjustment switching unit 2006 switches whether or not to connectively adjust the left and right images (or adjust together) during adjustments of the adjustment sliders 1201 in FIG. 12. This embodiment can set whether or not to connectively adjust the left and right images using a connection setting (box) 1203 in FIG. 12. This embodiment displays the UI, and the user manually switches whether or not to connectively adjust the left and right images, but this adjustment may be automatically switched.

For example, automatic switching may be performed as follows. That is, in a case where the reference image is adjusted, it is assumed that the in-focus degree is not good as a whole, so the connective adjustment. On the other hand, in a case where the adjustment image is adjusted, it is assumed that the adjustment image has a focus shift from the reference image, so the adjustment is individually performed without connection. The image display unit 2007 displays an image formed by the right-eye optical system and an image formed by the left-eye optical system on the display unit 606, respectively.

Thus, in this embodiment, the processing unit 1100 includes a refocusing unit that can adjust the refocus processing for at least one of the first image data and the second image data using the refocus unit 2004. The refocusing unit corresponds to at least one of the focus index display unit 2005, the connective adjustment switching unit 2006, and the image display unit 2007.

Figure 13:
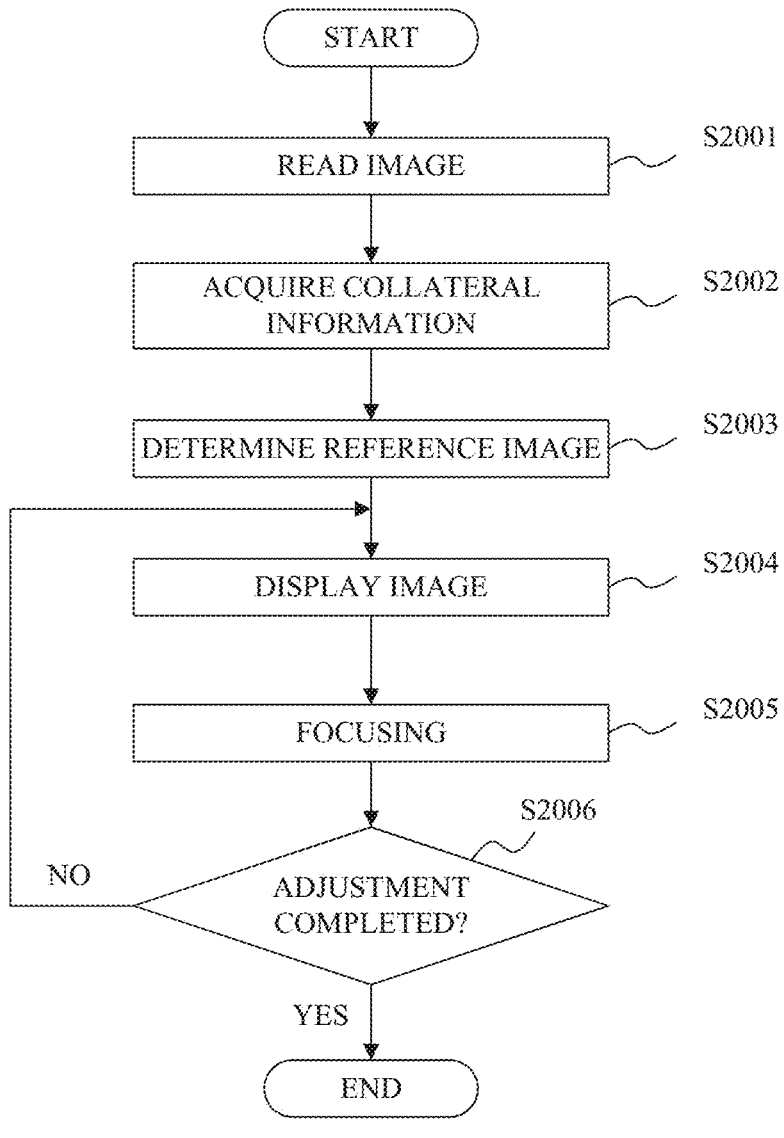
FIG. 13 is a flowchart illustrating the operation procedure according to the second embodiment.

Referring now to FIG. 13, a description will be given of an operation (image processing method) of the processing unit 1100 according to this embodiment. FIG. 13 is a flowchart illustrating an operation procedure of the processing unit 1100.

In step S2001, the image acquiring unit 2000 acquires an image, for example, from the recording medium 604 (reads the image).

In step S2002, the collateral information acquiring unit 2001 acquires collateral information.

In step S2003, the reference image determining unit 2002 determines a reference image and an adjustment image.

In step S2004, the image display unit 2007 displays an image formed by the right-eye optical system and an image formed by the left-eye optical system on the display unit 606.

In step S2005, the focusing unit 2003 performs focusing for the image formed by the right-eye optical system and the image formed by the left-eye optical system, and updates these images.

In step S2006, in a case where the user continues the adjustment, the flow returns to step S2004 to update the displayed image and to continue focusing. On the other hand, in a case where the user completes the adjustment, this flow ends.

In images captured in the multi-view imaging mode, this embodiment can perform focusing for the image formed by the right-eye optical system and the image formed by the left-eye optical system respectively, and reduce a focus shift between these images.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an image processing apparatus, an image pickup apparatus, an image processing method, and a storage medium, each of which can adjust a focus shift between two images having parallax after imaging.

This application claims priority to Japanese Patent Application No. 2023-095033, which was filed on Jun. 8, 2023, and which is hereby incorporated by reference herein in its entirety.

What is claimed is:

1. An image processing apparatus comprising:
a memory storing instructions; and
a processor configured to execute the instructions to:
acquire first image data acquired by imaging via a first optical system and second image data acquired by imaging via a second optical system, and
adjust an in-focus degree difference between the first image data and the second image data by performing refocus processing,
wherein the refocus processing is performed after the first and second image data are stored in the memory,
wherein the refocus processing is configured to reset a focal plane and re-composite the other of the first image data and the second image data using one of the first image data and the second image data as reference image data.

2. The image processing apparatus according to claim 1, wherein the processor is configured to determine the one of the first image data and the second image data as the reference image data.

3. The image processing apparatus according to claim 2, wherein the processor is configured to acquire collateral information corresponding to each of the first image data and the second image data.

4. The image processing apparatus according to claim 3, wherein the processor is configured to determine the reference image data using the collateral information.

5. The image processing apparatus according to claim 3, wherein the processor is configured to adjust the in-focus degree difference between the first image data and the second image data at a predetermined position determined by the collateral information.

6. The image processing apparatus according to claim 2, wherein the processor is configured to determine the reference image data based on the in-focus degree difference between the first image data and the second image data.

7. The image processing apparatus according to claim 1, wherein the processor is configured to display a warning when determining that the in-focus degree difference cannot be adjusted.

8. The image processing apparatus according to claim 1, wherein the first image data includes a first image, and a first parallax image and a second parallax image that have parallax with each other,
wherein the first image is an image acquired by adding up the first parallax image and the second parallax image, wherein the second image data includes a second image having parallax with the first image, and a third parallax image and a fourth parallax image having parallax with each other, wherein the second image is an image obtained by adding up the third parallax image and the fourth parallax image, and wherein the processor is configured to:

perform the refocus processing for the first image using the first parallax image and the second parallax image, and perform the refocus processing for the second image using the third parallax image and the fourth parallax image.

9. The image processing apparatus according to claim 8, wherein the first parallax image and the second parallax image are images corresponding to light beams passing through mutually different pupil areas in the first optical system, and wherein the third parallax image and the fourth parallax image are images corresponding to light beams passing through mutually different pupil areas in the second optical system.

10. An image pickup apparatus comprising:

an image sensor; and the image processing apparatus according to claim 1.

11. An image processing apparatus comprising:

a memory storing instructions; and a processor configured to execute the instructions to:

acquire first image data acquired by imaging via a first optical system and second image data acquired by imaging via a second optical system, and switch between independently adjusting of refocus processing for the first image data and the second image data, and connectively adjusting of the refocus processing for the first image data and the second image data, wherein the refocus processing is performed after the first and second image data are stored in the memory, wherein the refocus processing is configured to reset a focal plane and re-composite the other of the first image data and the second image data using one of the first image data and the second image data as reference image data.

12. The image processing apparatus according to claim 11, wherein the processor is configured to display an index indicating an in-focus degree of the first image data and an index indicating an in-focus degree of the second image data.

13. An image processing method comprising the steps of:

acquiring first image data acquired by imaging via a first optical system and second image data acquired by imaging via a second optical system, and adjusting an in-focus degree difference between the first image data and the second image data by performing refocus processing for, wherein the refocus processing is performed after the first and second image data are stored in the memory, wherein the refocus processing is configured to reset a focal plane and re-composite the other of the first image data and the second image data using one of the first image data and the second image data as reference image data.

14. A non-transitory computer-readable storage medium storing a program that causes a computer to execute the image processing method according to claim 13.

15. An image processing method comprising the steps of:

acquiring first image data acquired by imaging via a first optical system and second image data acquired by imaging via a second optical system, and switching between independently adjusting of refocus processing for the first image data and the second image data, and connectively adjusting of the refocus processing for the first image data and the second image data, wherein the refocus processing is performed after the first and second image data are stored in the memory, wherein the refocus processing is configured to reset a focal plane and re-composite the other of the first image data and the second image data using one of the first image data and the second image data as reference image data.

16. A non-transitory computer-readable storage medium storing a program that causes a computer to execute the image processing method according to claim 15.

\* \* \* \* \*